US008438295B2

(12) United States Patent
Shukla et al.

(10) Patent No.: US 8,438,295 B2
(45) Date of Patent: May 7, 2013

(54) DECLARATIVE PROGRAMMING MODEL FOR MODELING AND EXECUTION OF TRIGGERS FOR RESOURCE ORIENTED SYSTEM

(75) Inventors: Dharma Shukla, Sammamish, WA (US); Aditya Bhandarkar, Redmond, WA (US); Ori Amiga, Seattle, WA (US); Raymond Endres, Redmond, WA (US); Abhay Parasnis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 432 days.

(21) Appl. No.: 12/250,637

(22) Filed: Oct. 14, 2008

(65) Prior Publication Data

US 2010/0094926 A1 Apr. 15, 2010

(51) Int. Cl.
*G06F 15/16* (2006.01)
(52) U.S. Cl.
USPC ............................................ 709/230; 709/203
(58) Field of Classification Search ................... 709/203, 709/230
See application file for complete search history.

(56) References Cited

U.S. PATENT DOCUMENTS

| | | | |
|---|---|---|---|
| 5,369,570 A | | 11/1994 | Parad |
| 5,564,044 A | * | 10/1996 | Pratt ............................. 718/106 |
| 5,640,572 A | | 6/1997 | Mondrik et al. |
| 5,826,239 A | | 10/1998 | Du et al. |
| 5,862,379 A | | 1/1999 | Rubin et al. |
| 5,983,265 A | * | 11/1999 | Martino, II .................... 709/206 |
| 5,991,802 A | * | 11/1999 | Allard et al. ................... 709/219 |
| 6,064,813 A | | 5/2000 | Sitbon et al. |
| 6,134,559 A | * | 10/2000 | Brumme et al. ....................... 1/1 |
| 6,178,546 B1 | | 1/2001 | McIntyre |
| 6,560,777 B2 | | 5/2003 | Blackketter et al. |
| 6,654,950 B1 | | 11/2003 | Barnishan |
| 6,668,354 B1 | | 12/2003 | Chen et al. |
| 6,775,658 B1 | | 8/2004 | Zothner |
| 7,035,943 B2 | | 4/2006 | Yamane et al. |
| 7,171,650 B2 | | 1/2007 | Fenton et al. |
| 7,194,473 B1 | | 3/2007 | Hichwa et al. |
| 7,239,034 B2 | | 7/2007 | Gehret, Jr. |

(Continued)

OTHER PUBLICATIONS

"API Test Console", Retrieved at <<http://www.google.com/base/api/demo/html/demo.html>>, Oct. 1, 2008, pp. 1-3.

(Continued)

*Primary Examiner* — Brian P Whipple
(74) *Attorney, Agent, or Firm* — Microsoft Corporation

(57) ABSTRACT

Data sets of various types may be accessible through a host according to a protocol, such as a RESTful HTTP interface. Various domains may involve domain-specific processes to be executed as pre-triggers or post-triggers of various protocol requests (e.g., an HTTP GET request specifying a Read operation on an access-restricted data set may involve an authorization operations set that verifies the access privileges of the requester.) A host of the data set may be configured to receive a resource script expressing the operations set in a script language, to store the resource script, and to associated it with at least one data set and at least one verb of the protocol. Upon later receiving a protocol request specifying the verb and the resource, the host may then execute the resource script (as a pre-trigger and/or as a post-trigger) in accordance with the business logic of the domain.

20 Claims, 5 Drawing Sheets

U.S. PATENT DOCUMENTS

| | | | |
|---|---|---|---|
| 7,289,964 | B1 | 10/2007 | Bowman-Amuah |
| 7,392,509 | B2 | 6/2008 | Sinha et al. |
| 7,441,188 | B1 | 10/2008 | Russell et al. |
| 7,555,757 | B2 | 6/2009 | Smith et al. |
| 7,581,212 | B2 | 8/2009 | West et al. |
| 7,607,124 | B2 | 10/2009 | Gooty et al. |
| 7,631,291 | B2 | 12/2009 | Shukla et al. |
| 7,721,259 | B2 | 5/2010 | Heinke et al. |
| 7,801,896 | B2 | 9/2010 | Szabo |
| 7,840,647 | B2 | 11/2010 | Kloba et al. |
| 7,870,498 | B2 | 1/2011 | Drummond et al. |
| 2003/0110096 | A1* | 6/2003 | Dathi ............................... 705/26 |
| 2003/0163567 | A1* | 8/2003 | McMorris et al. ............ 709/225 |
| 2003/0167317 | A1* | 9/2003 | Deen et al. .................... 709/219 |
| 2003/0182463 | A1 | 9/2003 | Valk |
| 2004/0027379 | A1 | 2/2004 | Hong Huey et al. |
| 2004/0133876 | A1 | 7/2004 | Sproule |
| 2004/0187080 | A1 | 9/2004 | Brooke et al. |
| 2004/0255046 | A1 | 12/2004 | Ringseth et al. |
| 2004/0258089 | A1* | 12/2004 | Derechin et al. .............. 370/465 |
| 2005/0044526 | A1 | 2/2005 | Kooy |
| 2005/0060685 | A1 | 3/2005 | Franz et al. |
| 2005/0097503 | A1 | 5/2005 | Zintel et al. |
| 2005/0114779 | A1 | 5/2005 | Griesmer |
| 2005/0120347 | A1 | 6/2005 | Asare et al. |
| 2005/0138137 | A1 | 6/2005 | Encamacion et al. |
| 2005/0177820 | A1 | 8/2005 | Mei et al. |
| 2006/0070086 | A1 | 3/2006 | Wang |
| 2006/0074734 | A1 | 4/2006 | Shukla et al. |
| 2006/0117073 | A1 | 6/2006 | Bosworth et al. |
| 2006/0150145 | A1 | 7/2006 | Khandekar |
| 2006/0230124 | A1 | 10/2006 | Belfiore et al. |
| 2006/0288332 | A1 | 12/2006 | Sarar et al. |
| 2007/0011672 | A1 | 1/2007 | Bhide et al. |
| 2007/0050512 | A1 | 3/2007 | Chintalapati et al. |
| 2007/0106649 | A1 | 5/2007 | Moore |
| 2007/0162899 | A1 | 7/2007 | Schmidt et al. |
| 2007/0226024 | A1 | 9/2007 | Harvey et al. |
| 2007/0226259 | A1 | 9/2007 | Kacin et al. |
| 2007/0239499 | A1 | 10/2007 | Shukla et al. |
| 2007/0256055 | A1 | 11/2007 | Herscu |
| 2007/0276692 | A1 | 11/2007 | Mei et al. |
| 2008/0155330 | A1 | 6/2008 | Van Wyk et al. |
| 2008/0201338 | A1 | 8/2008 | Castro et al. |
| 2009/0106739 | A1 | 4/2009 | Weatherbee et al. |
| 2009/0187573 | A1 | 7/2009 | Johnston et al. |
| 2009/0249695 | A1 | 10/2009 | Jain |
| 2009/0254881 | A1 | 10/2009 | Johnson et al. |
| 2009/0292766 | A1 | 11/2009 | Morris |

OTHER PUBLICATIONS

"Interactive Development Environment (IDE) Enhancements", Retrieved at <<http://msdn.microsoft.com/en-us/library/aa976855(VS.71).aspx>> Oct. 1, 2008.

"Live Search Interactive SDK", Retrieved at <<http://dev.live.com/livesearch/sdk/>>, Oct. 1, 2008, p. 1.

Massoni, Joe, "An Inside Look at Developing Applications using the New Features of Visual C++ 6.0", Retrieved at <<http://www.microsoft.com/msj/1098/vc6newfeatures/vc6newfeatures.aspx>>, Oct. 1998, Sep. 30, 2008, pp. 1-11.

"Microsoft Dynamics AX Debugger", Retrieved at <<http://msdn.microsoft.com/en-us/library/aa569669(AX.10).aspx>>, Oct. 1, 2008, p. 1.

"Pipes", Retrieved at <<http://pipes.yahoo.com/pipes/pipes.popular>>, Oct. 1, 2008, pp. 1-6.

"Play with the APIs", Retrieved at<<http://blog.programmableweb.com/2007/03/26/9-places-to-use-apis-without-coding/>>, Oct. 1, 2008, pp. 1-7.

"PopFly Designer", Retrieved at <<http://www.popfly.com/Home.aspx>>, Oct. 1, 2008, pp. 1-3.

"Resource Builder 2.3.3", Retrieved at <<http://www.bluechillies.com/details/16235.html>>, Sep. 30, 2008, pp. 1-2.

"Tablet PC Add Support for Digital Ink to Your Windows Applications", Retrieved at <<http://msdn.microsoft.com/en-us/magazine/cc163869.aspx>>, Sep. 30, 2008, pp. 1-11.

Valley, Scotts , "CodeGear™ Accelerates Web Development with New Version of its Visual Development Environment for PHP", Retrieved at <<http://www.codegear.com/article/37885>>, California , Apr. 14, 2008, p. 1.

"Virtual Earth Interactive SDK", Retrieved at <<http://dev.live.com/virtualearth/sdk/>>, Oct. 1, 2008, p. 1.

"Windows Live Dev", Retrieved at <<http://dev.live.com/livedata/sdk/>>, Oct. 1, 2008, p. 1.

"Windows Workflow Foundation Designer" Retrieved at <<http://msdn.microsoft.com/en-us/library/ms441543.aspx>>, Oct. 1, 2008, pp. 1-2.

"Yahoo-Pipes", Retrieved at <<http://pipes.yahoo.com/pipes>>, Oct. 1, 2008, p. 1.

International Search Report cited in related PCT Application No. PCY/US2009/061024 dated Jun. 7, 2010.

"Enforcing Business Rules with Triggers", Retrieved at <<http://msdn.microsoft.com/en-us/library/aa214450(SQL.80).aspx>>, Jun. 25, 2008, p. 1.

Mazzetti, et al., "RESTful Implementation of Geospatial Services", Retrieved at <<http://www.cosis.net/abstracts/EGU2008/05160/EGU2008-A-05160-1.pdf?PHPSESSID=>>, Geophysical Research Abstracts, vol. 10, EGU2008-A-05160, 2008, EGU General Assembly 2008.

U.S. Appl. No. 12/250,600, filed Oct. 14, 2008, Shukla et al.

U.S. Appl. No. 12/253,545, filed Oct. 17, 2008, Shukla et al.

"Batch!" retrieved at <<http://www.snellspace.com/wp/?p=788>>, Jun. 25, 2008, pp. 6.

"Batch Processing with Google Data APIs", retrieved at <<http://code.google.com/apis/gdata/batch.html>>, Jun. 25, 2008, pp. 17.

Catone, Josh, "Live Mesh: First Look at Microsoft's New Platform", retrieved at <<http://www.readwriteweb.com/archives/microsoft_live_mesh_first_look.php>>, Apr. 22, 2008, pp. 4.

"DropBox", retrieved at <<http://www.getdropbox.com/>>, Jun. 26, 2008, pp. 3.

Needleman, Rafe, "SugarSync: Most Useful Sync Tool Ever. But You'll Pay for it.", retrieved at <<http://www.webware.com/8301-1_109-9895297-2.html>>, Mar. 19, 2008, pp. 2.

"Proposal for an OpenSocial RESTful API (DRAFT)", retrieved at <<http://docs.google.com/View?docid=dfjqf7vg__3cwzpkw2z>>, pp. 7.

Redmond, Wash. "Microsoft Acquires FolderShare, a File-Synchronization Technology Provider", retrieved at <<http://www.microsoft.com/presspass/press/2005/nov05/11-03FolderSharePR.mspx>>, Nov. 3, 2005 pp. 2.

"Son of a Batch!", retrieved at <<http://www.snellspace.com/wp/?p=885>>, Jun. 25, 2008, pp. 2.

Int. Preliminary Report on Patentability cited in PCT Application No. PCT/US2009/061024 dated Apr. 19, 2011, 4 pgs.

"REST-Based Service Oriented Architecture for Dynamically Integrated Information Systems", Daniel Szepielak, 2008, reprinted from the Internet at: https://docs.google.com/viewer?a=v&q=cache:FzzXZR32ze0J:citeseerx.ist.psu.edu/viewdocidownload?doi%3D10.1.1.102.5846%26rep%3Drepl%26type%3Dpdf+rest-based+service+oriented +architecture+for+dynamically+intgegrated+information+systems&hl=en&gl=us&pid=basrcid=ADGEESh8Yxag9ykzVp6YEnIgRD5Xq8CT6v9eWTLv35BOlfsPyybzsf3reQvMy.WCOP2ZSwhTIrcxiM8OWAz_9easJK6gZoihCMHcqvGkUfpPiQQWQzVmrTlucoLu3D0-wEL1LyvhVdn E&sig=AHIEtbS4mp1mwSoj4LEE7Xi2wz_iZSWxlg, 6 pgs.

"Proposal for an OpenSocial RESTful API (DRAFT)", Feb. 27, 2008, reprinted from the Internet at: https://docs.google.com/document/pub?id=1Rx1LPvVOPS7P3OfVnvmxL0JsHx3SE6u06iepMhXeJx8, 7 pgs.

"BeInSync Professional", Jun. 5, 2007, reprinted from the Internet at: http://www.beinsync.com/products/professional/, 2 pgs.

Non-Final Office Action cited in U.S. Appl. No. 12/250,600 dated Nov. 28, 2011, 29 pgs.

Rely to Non-Final Office Action cited in U.S. Appl. No. 12/250,600 dated Feb. 28, 2012, 23 pgs.

Final Office Action cited in U.S. Appl. No. 12/250,600 dated May 3, 2012, 39 pgs.
Reply to Final Office Action cited in U.S. Appl. No. 12/250,600 dated Aug. 3, 2012, 17 pgs.
Non-Final Office Action cited in U.S. Appl. No. 12/253,545 dated Aug. 15, 2012, 27 pgs.
Reply to Non-Final Office Action cited in U.S. Appl. No. 12/253,545 dated Dec. 17, 2012, 22 pgs.
"Cross-Platform Integration with SML and SOAP", Timothy M. Chester, IT Pro, Published Sep./Oct. 2001, reprinted from the Internet at: http://ieeexplore.ieee.org/xpl/articleDetails.jsp?amumber=952977, pp. 26-34.

"Build Perl Applications with Eclipse", Martin Brown, published Jan. 17, 2006, Internet article, http://www.ibm.com/developerworks/opensource/tutorials/os-perlecl/section3.html13, pp. 1-5.
"Mastering Perl for Bioinformatics", James D. Tisdall, Chapter 3, 2003, http://etutorials.org/Programming/perl+bioinformatics/Part+1+Object=Oriented+Programming+in+Perl/Chapter+3+Object+Oriented+Programming+in+Perl/, p. 72.
"Common Gateway Interface", Published Feb. 18, 2006, Wikipedia article, http://web.archive.org/web/20060220020004/http://en.wikipedia.org/wiki/Common_Gateway_interface, pp. 1-3.

* cited by examiner

DECLARATIVE PROGRAMMING MODEL FOR MODELING AND EXECUTION OF TRIGGERS FOR RESOURCE ORIENTED SYSTEM

BACKGROUND

Many computing scenarios involve a data set (such as a file system, a database, an object set, etc.) that managed by a host, and that is to be updated based on a set of operations, such as creating one or more items in the data set, reading one or more items in the data set, updating one or more items in the data set, and/or deleting one or more items in the data set (together comprising a standard set of "CRUD" operations.) Moreover, the host may be accessible through a particular protocol, such as HTTP, and the operations may correspond to a set of verbs permitted in the protocol (e.g., HTTP POST, HTTP GET, HTTP PUT, and HTTP DELETE.) An operations set may involve a series of such operations configured in a sequence to achieve a particular result (e.g., bidirectionally synchronizing a portion of a filesystem on a remote server with a locally stored version of the same portion of the filesystem.) This operations set may be performed on a device other than the host, e.g., by issuing a first operation to the host, and upon receiving notice of completion of the operation issuing a second operation, etc. The operations set may also be performed on the device as part of an application, e.g., a data-driven application that exchanges data with the host as the source of the data featured in the application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In some domains, access to a data set through a protocol may involve additional processing beyond the processing involved in fulfilling the accessing. For example, in order to fulfill a read request, a host may receive the request, access of a data store containing the data set, format the data set (such as by serializing the data set according to a wire protocol for delivery), prepare a response including the formatted data set, and return the response. However, in some domains, this fulfilling may also involve additional processing, such as validating the authorization of the requester to access a secured data set, recording a log of the accessing of the data set, and supplementing the response with additional information stored in the data source that is associated with the requested data set. Such operations may be specific to all or some of the data sets in a particular domain, such as within a particular company or in relation to a particular project. Clients may be expected to fulfill such additional processing through additional requests. However, a decentralized arrangement may be undesirable in many aspects. For example, allocating authorization and logging processes to a wide range of client applications may diminish security control and reveal sensitive details about the host and security processes; and communicating a particular process for accessing a particular data set may be complicated or unattainable among a wide variety of client applications.

In these scenarios, it may be advantageous to centralize the additional processing with the data sets. Client applications may be permitted to submit requests according to the protocol, and the host may perform the supplemental processes associated with a particular request for a particular data set. One technique for achieving this configuration involves associating with particular data sets a resource script, which may be executed upon receiving particular requests according to the protocol. For example, a script may be associated as a pre-trigger or a post-trigger with a particular verb of the protocol; e.g., a write authorization pre-trigger script may be associated with HTTP POST, HTTP PUT, and HTTP DELETE verbs for a particular data set, while an access logging post-trigger script may be associated with these three verbs and HTTP GET for the data set. The host may receive and store such resource scripts with association to particular data sets; and upon receiving a request specifying a verb of the protocol upon a data set associated with at least one resource script, the host may retrieve and execute the associated resource scripts (e.g., the pre-trigger scripts may be executed before, and possibly as a precondition, of applying the verb of the request to the data set, and post-trigger scripts may be executed after such applying.) In this manner, the host may supplement the protocol-based accessing of the data sets in a reliable and centralized manner without complicating the design of client applications accessing the data sets through the hosts.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
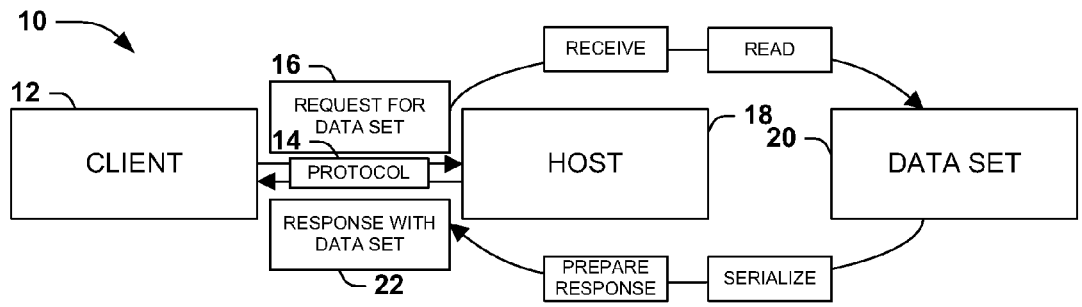
FIG. 1 is an illustration of an accessing by a client of a data set through a host according to a protocol.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many computing scenarios involve a data set managed by a host, such as a filesystem hosted by a filesystem host, a database hosted by a database server, and an object set hosted by an object server. The data set may be exposed to various clients, such as devices and users, which may perform various operations on the data set. Many such scenarios include a basic set of operations for manipulating the data set, such as create, read, update, and delete operations (together referred to as a "CRUD" model for manipulating data sets.) Moreover, these operations are often combined in a particular configuration to achieve a particular task, such as synchronizing a remote filesystem on a server with a local version of the filesystem or inserting records into a database in a transactional manner.

The computing host may be configured to receive requests for performing such operations if specified according to a particular protocol. For example, the host may be configured as an HTTP endpoint (such as a webserver), and may permit interaction with the data set through a standard set of HTTP verbs. The hypertext transfer protocol was originally devised for communicating with a webserver (e.g., to request a page or resource stored on the webserver via HTTP GET) and a set of applications provided therein (such as HTTP gateway scripts, which could be accessed with parameters via HTTP POST), many servers translate HTTP requests to particular instructions for manipulating a data set (e.g., HTTP POST corresponding to a read instruction; HTTP GET corresponding to a create instruction; HTTP PUT corresponding to an update instruction; and HTTP DELETE corresponding to a delete instruction.) This configuration, sometimes referred to as a representational state transfer ("RESTful") use of a protocol, permits the server to extend access to the data set to a wide range of applications over a widely supported protocol.

Client applications may endeavor to utilize one or more data set accessible through a host by executing various operations that invoke the verbs of the protocol. FIG. 1 illustrates an exemplary scenario 10 in which a client 12 performs an operation (in this case, a Read operation) on a data set 20 through a host 18 according to a protocol 14 (e.g., an HTTP protocol provided by a webserver serving as the host 18.) The client 12 may perform the operation by issuing a protocol request 16 through the protocol 14 (e.g., an HTTP GET request.) In fulfilling such accesses, the host 18 may have to perform particular actions. For example, the host 18 may first have to receive the protocol request 16 and parse it to determine the requested operation. The host 18 may then initiate a reading of the data set 20 (e.g., from a storage device or a database.) Upon completing the reading, the host 18 may then have to format the data set 20, such as by serializing the data set 20 according to a wire protocol for delivery, and then prepare a response 22 to the request 16 that includes the data set 20 (and possibly some other details, such as a status code indicating the success or failure of the operation.) The host 18 may then return the response 22 to the client 12, e.g., by queuing the response 22 for delivery over a network, and may perform various cleanup operations, such as closing a network connection with the client 12 and closing a connection with a database storing the data set 20. It may be appreciated that a client may generate and issue a large set of such operations in a variety of organizations (e.g., in sequential and/or concurrent execution) while performing a variety of tasks involving the data set 20.

However, in some domains, additional processing may also be involved in fulfilling a particular request through the protocol 14. As a first example, a host 18 may provide access to a secured data set 20 only to certain authorized users (e.g., a request for a patient record in a healthcare-related database may restrict access to such information to the assigned healthcare providers of the patient.) As a second example, a data set 20 may be associated with supplemental information, such as related records stored in a different location (e.g., a request for a patient record in a healthcare-related database may be supplemented with information about the patient's health condition that may be derived from a medical laboratory database.) As a third example, accesses to a data set 20 may be logged for security and auditing purposes (e.g., a request for a patient record in a healthcare-related database, even if authorized, may be logged in order to fulfill auditing policy and legal obligations.) Such supplemental processing may be relevant only within a particular domain (such as the healthcare-related database), and may only be relevant for particular data sets (e.g., other data sets may be stored and accessed through the host 18 without such supplemental processing, such as biographical information about healthcare providers that may be publicly exposed through a hospital website without authorizing, supplementing, or logging.)

Figure 2:
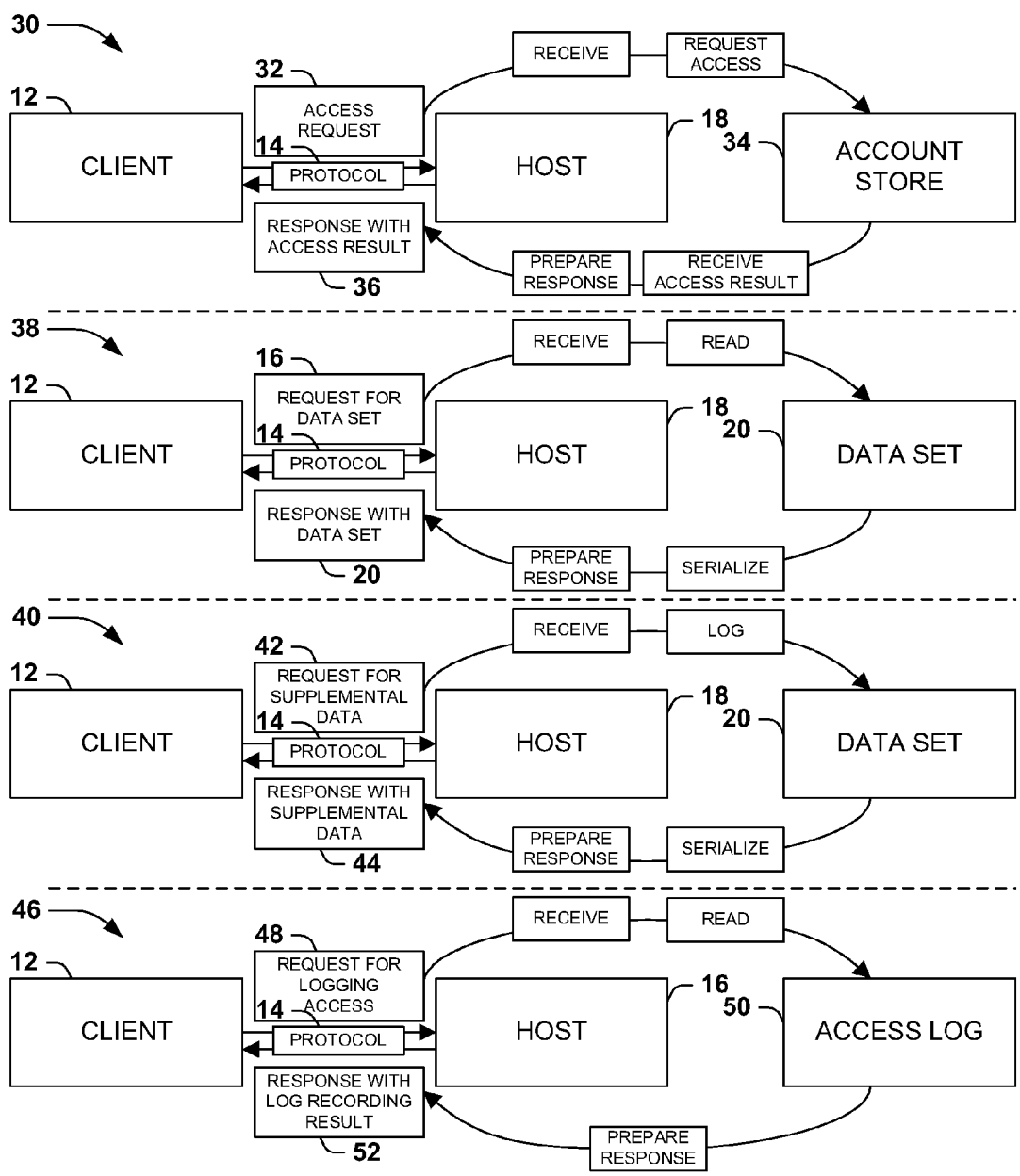
FIG. 2 is an illustration of an accessing by a client of a data set through a host according to a protocol that includes supplemental client-side processing.

It may be difficult to associate the supplemental processing with the operations performed through the protocol 14. FIG. 2 illustrates a first example, where the client 12 is delegated the responsibility of complying with all such processing. In order to fulfill the supplemental processing, in a first interaction 30, the client 12 submits an access request 32, which may include, e.g., an identification of the particular data set to be accessed (such as a particular patient record) and/or an identification of the client 12 (such as a username and password.) The host 18 may verify the access privileges of the client 12 against an account store 34 that contains account information for authorized users and is capable of verifying such credentials. If the account store 34 authorizes the client 12 and the access request 32, the host 18 may receive the access result from the account store 34 and prepare an access response 36 authorizing access to the client 12. In a second interaction 38, the client 12 may submit the request 16 for the data set 20, and the host 18 may receive and parse the request 16, read the data set 20 and serialize the results, and provide the response 20. In a third interaction 40, the client 12 may submit a second request 42 for the supplemental data, and the host 18 may also receive and parse the second request 42, read and serialize the supplemental data, and provide a second response 44 with the serialized supplemental data. Finally, in a fourth interaction 46, the client 12 may submit an access logging request 48. The host 16 may receive and parse the access logging request 48, log the accessing in an access log 50, and prepare and return to the client 12 a log recording response 52 indicating the success or failure of the logging operation.

As illustrated in FIG. 2, the client 12 may perform the domain-specific operations that precondition and/or supplement the operation requested through the protocol 14. However, it may be appreciated that allocating such operations to the client may be undesirable in several aspects. As a first example, the interactions between the client 12 and the host 16 are often performed over a network, and the respective interactions may involve a network transport cost. The large number of interactions involved in achieving the desired reading of the data set 20 may multiply the network transport costs and diminish the performance of data-driven application based thereupon. As a second example, it may be undesirable to allocate the responsibility for performing such actions to a client 12 that is untrusted (e.g., an application written by an untrusted outside party, or a trusted application provided to untrusted users who may modify such applications to reduce compliance with these accessing policies.) As a third example, even if the clients 12 are trusted, it may be difficult to update all of the clients 12 to perform new supplemental processing if the accessing policies change (e.g., if a second layer of security, such as an exchange of data encryption keys, is implemented as an additional precondition of the accessing.)

Some or all of these drawbacks may be alleviated by a more centralized design that allocates some or all of the supplemental processing to the host 16. A host 16 may associate some supplemental processing with various types of requests pertaining to various data sets. For example, the supplemental processing may be associated with particular verbs of the protocol 14 through which the host 18 provides access to the data set 20. For example, for particular data sets (such as patient records), authorization processing may be associated with the HTTP GET verb as a precondition trigger, such that a protocol request 16 including such a verb for such a data set 20 triggers the authorization processing as a predicate condition of performing the verb. Similarly, processes that supplement the data set 20 retrieved by Read operations and log the accesses to the data set 20 (e.g., in an access log 50) may be associated with the HTTP GET verb as post-condition triggers, such that successful HTTP GET operations trigger these subsequent processes as part of the response.

Associating such processes with the host 18 may be achieved in many ways. As a first example, the accessing processes of the host 16 may be rewritten to invoke the additional processes; however, such hard-coding of low-level functions may be error-prone, resulting in potentially severe failures, and difficult to maintain or synchronize with other hosts 16 (e.g., in server farm scenarios where many hosts 16 provide mirrored functionality for scalable service.) As a second example, additional access layers may be devised to wrap the host 16, such as monitoring processes, firewalls, and network logging devices. However, it may be inefficient to provide such processing in additional processes and/or devices that involve separate sets of maintenance, and that operate at a logical distance from the host 16.

As an alternative technique, the supplemental processing may be expressed as a resource script, which may specify a supplemental operations set according to a scripting language. A host may be configured to receive such resource scripts (e.g., from system administrators) and to associate such scripts with particular verbs of the protocol when applied to particular data sets. A host so configured may, upon receiving a protocol request specifying a particular verb to be applied to a particular data set, identify any resource scripts that are associated with the verb and the data set. Identified resource scripts may then be executed, e.g., as pre-triggers preceding the application of the protocol request and/or as post-triggers following the application of the protocol request. This technique encapsulates the supplemental processing in resource scripts that may be blended with the processing of protocol requests, without affecting the evaluation pipeline of the host (e.g., the operation of the host as a webserver, such as illustrated in FIG. 1.) Moreover, the modularity of the resource scripts promotes the maintenance of supplemental processing, as an alteration of the processing may be achieved without affecting other components of the host simply by swapping in an updated resource script. In this manner, the supplemental processing is included with the services provided by the host in an integrated architecture that maintains centralization and control over such processing, while also promoting maintainability.

Figure 3:
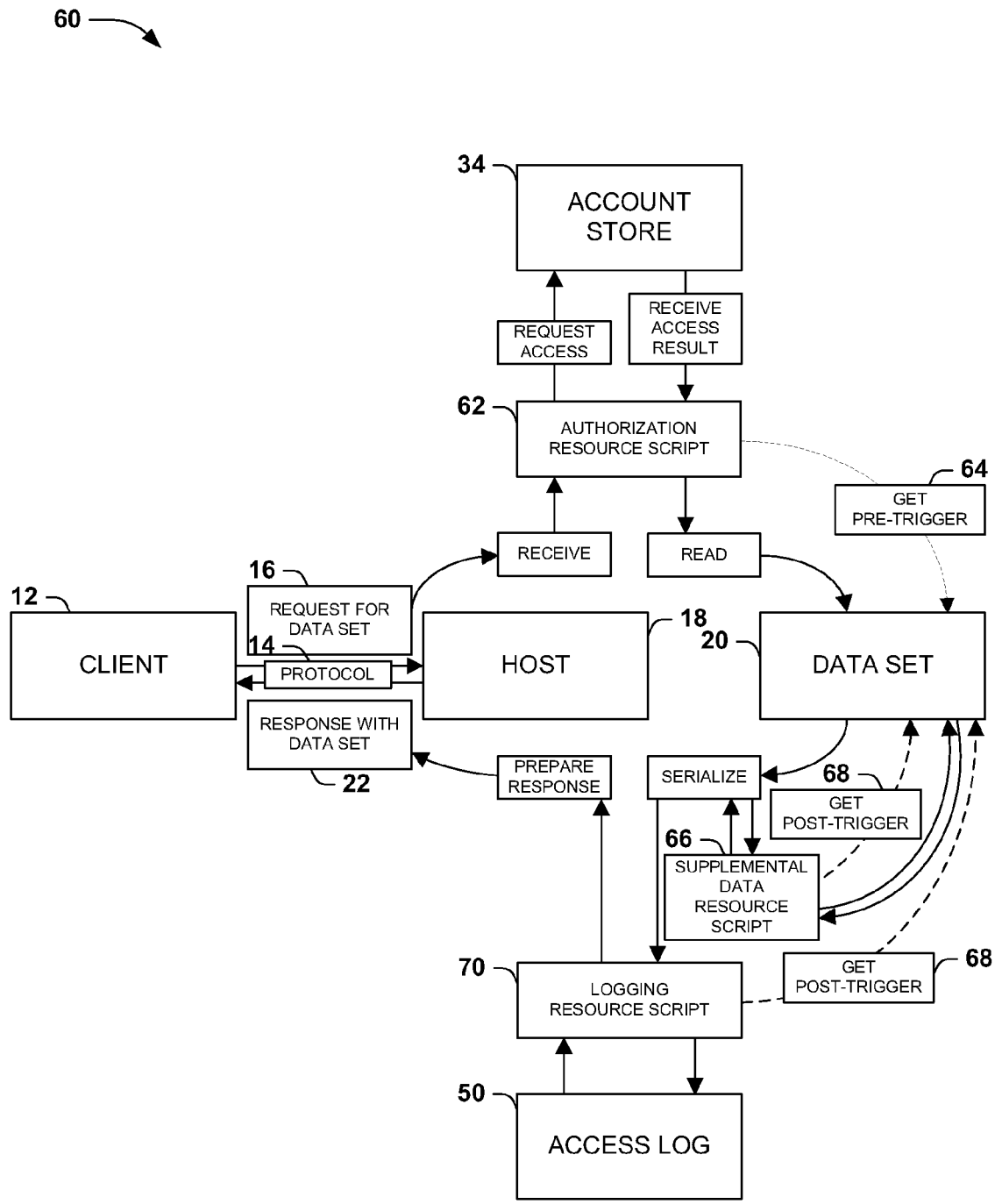
FIG. 3 is an illustration of an accessing by a client of a data set through a host according to a protocol that includes supplemental host-side processing through resource scripts associated as triggers with the data set.

FIG. 3 presents an exemplary scenario 60 featuring this alternative technique that illustrates certain advantages, such as centralization, security, and modularity that may improve the maintainability of the host 18, the supplemental processing, and the accessing of the data set 20. This exemplary scenario 60 involves a client 12 submitting a protocol request 16 through a protocol 14 to a host 18 for application to a data set 20 comprising a Read operation (such as an HTTP GET operation submitted to a host 18 operating as a webserver in a RESTful interaction.) However, the host 18 in this exemplary scenario 60 is configured to apply three resource scripts to such operations applied to the specified data set 20: an authorization resource script 62 having a GET pre-trigger association 64 with the data set 20 that verifies the authorization of the client 12 to access the data set 20; a supplemental data resource script 66 having a GET post-trigger association 68 with the data set 20 that supplements GET accesses to the data set 20 with additional information; and a logging resource script 70 having a GET post-trigger association 68 with the data set 20 that implements an access logging feature. Upon parsing the protocol request 16 and identifying the HTTP GET verb specified against the data set 20, the host 18 retrieves the pre-trigger resource script 62 and executes it, e.g., by providing a set of credentials provided in the protocol request 16 to an account store 34 for authorization. Upon receiving notice of the authorization, the pre-trigger resource script 62 may acknowledge the granting of access, and the host 18 may apply the Read operation to the data set 20. After applying the Read operation, the host 18 may identify and execute the supplemental data resource script 66, which may retrieve supplemental information (e.g., from a second data source) and include it with the data set 20. The host 18 may also invoke the logging resource script 70, which may record the Read access by the client 12 in the access log 50. Having performed the Read operation on the data set 20 and having executed the pre-trigger and post-trigger scripts associated with such accessing, the host 18 may then prepare a response 22 (including both the data set 20 and the supplemental information) to the host 12 to complete the protocol request 16.

Figure 4:
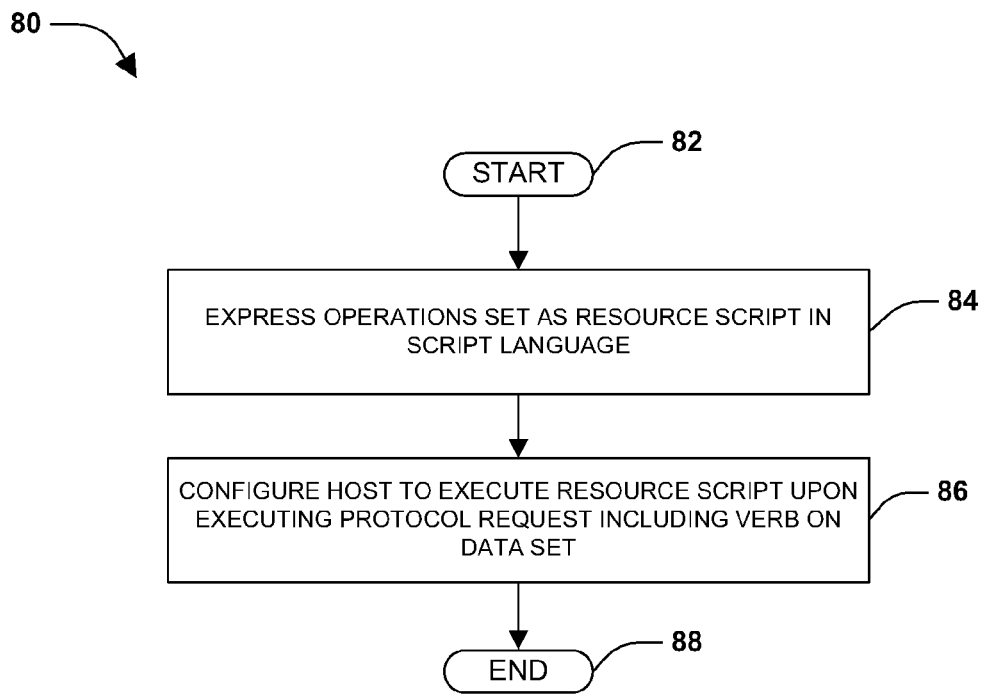
FIG. 4 is a flow chart illustrating an exemplary method of executing an operations set on a data set accessible through a host according to a protocol.

FIG. 4 illustrates a first embodiment of the techniques discussed herein and illustrated in FIG. 3, comprising an exemplary method 80 of executing an operations set on a data set accessible through a host according to a protocol. The exemplary method 80 begins at 82 and involves expressing 84 the operations set as a resource script in a script language. The exemplary method 80 also involves configuring 86 the host to execute the resource script upon executing a protocol request specifying the verb on the data set. Having generated a resource script expressing the operation set to be utilized as a trigger, and having associated the resource script with at least one verb and at least one resource accessible through the host, the exemplary method 80 thereby achieves the configuring of the host to perform the operations set, and so ends at 88.

Figure 5:
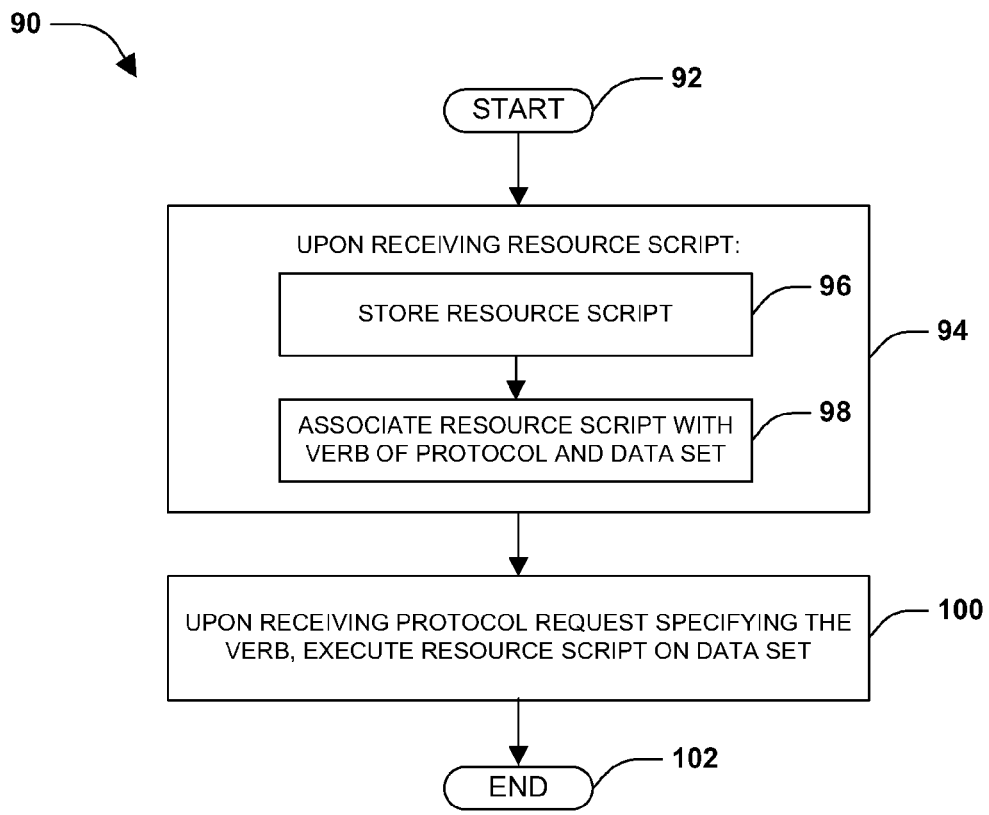
FIG. 5 is a flow chart illustrating another exemplary method of executing a resource script on a data set accessible according to a protocol.

FIG. 5 illustrates a second embodiment of the techniques discussed herein and illustrated in FIG. 3, comprising another exemplary method 90 of executing a resource script on a data set accessible according to a protocol. This exemplary method 90 begins at 92 and involves, upon receiving 94 a resource script, storing 96 the resource script and associating 98 the resource script with a verb of the protocol and the data set. In this manner, the exemplary method 90 achieves the configuring of the host to execute the resource script when a protocol request seeks to apply the specified verb to the specified data set. The exemplary method 90 also involves, upon receiving a protocol request specifying the verb, executing 100 the resource script on the data set. By receiving and storing the resource script, associating the resource script with a resource and a verb of the protocol, and executing the resource script upon receiving a protocol request to perform the verb on the data set, the exemplary method 90 thereby achieves a trigger-based executing of the resource script, and so ends at 102.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 80 of FIG. 4 and the exemplary method 90 of FIG. 5) to confer individual and/or synergistic advantages upon such embodiments.

A first aspect that may vary among embodiments of these techniques involves the scenarios in which the techniques may be applied. As a first example, the techniques may be applied in scenario involving data sets stored and accessed within a particular domain, whereby the resource scripts may be devised to implement business logic of the domain. For example, a data set may comprise a patient record in a healthcare-related database, which may be subject to certain policies in the healthcare domain of both a non-technical nature (e.g., securing access based on user authorization, and logging accesses in compliance with medical privacy policies) and a technical nature (e.g., supplementing accessed patient records with additional information from other data sources, such as a medical laboratory database.) The operations set may therefore specify a domain-specific operation on the data set within the domain, such as custom business logic supplementing the ordinary processes in fulfilling protocol requests.

As a second example of this first aspect, the data sets accessed in these scenarios may comprise many representations. One such scenario may be devised to address the increasingly large and diverse set of objects managed by a set of object systems. For example, a computing environment may comprise a set of files managed by a file system, one or more databases managed by a database system, a set of executable binaries representing applications and managed by an assembly cache, a set of user profiles managed by a user profile component of an operating system, and various data caches managed by data caching components, such as a set of copied items managed by a copy buffer of the operating system, a set of undo actions managed by an undo component of the operating system, and a set of "most recently used" items managed by an item usage tracking component of the operating system. Moreover, such objects may be exchanged among a plurality of devices operated by one or more users, and according to one or more operations (e.g., an object synchronization operation that merges two object sets and an object mirroring operation that adjusts a target object set to match a source object set.) In this manner, the objects are loosely organized through a set of object systems and aggregated to represent the computing environment.

In order to reduce the complex variety and decentralization of the objects comprising a contemporary computing environment, a deployable representation of the computing environment may be devised, where the objects comprising the computing environment are organized in an object hierarchy, which may be hosted by a computing environment host. If the objects are represented in a uniform manner and managed in a consistent way by an object system, a set of services may be devised to apply to all of the objects of the computing environment. Moreover, the object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) With relation to the concept of a deployable computing environment, it may be advantageous to configure at least one server to manage one or more data objects within the representation, and to operate as a host that accepts access requests to such resources through a protocol (such as RESTful interactions over HTTP.) In accordance with these techniques, the host may supplement the accessing of resources in this deployable computing environment with resource scripts associated with the verbs of the protocol that are triggered upon receiving a protocol request specifying the verb and the resource. Such configurations may be particularly useful for implementing domain-specific logic within the deployable computing environment. However, those of ordinary skill in the art may devise many such scenarios in which the techniques discussed herein may be applied.

As a third example of this first scenario, the script language in which the operations sets are specified may be devised to model many protocols. As one example, where the host comprises an HTTP endpoint (such as a webserver), resource scripts specified in a script language that models the data set instructions on HTTP verbs (such as HTTP POST, HTTP GET, HTTP PUT, and HTTP DELETE) may advantageously promote easier interfacing and wider compatibility with many types of hosts. However, other protocols may be utilized; e.g., where the host comprises an FTP server, the script language may include data set instructions modeled after FTP verbs, such as GET and PUT; and where the host comprises a POP email server, the script language may include data set instructions modeled after POP verbs, such as LIST, RETR, and DELE. Those of ordinary skill in the art may devise many scenarios in which the techniques discussed herein may be utilized.

A second aspect that may vary among embodiments of these techniques relates to the types and capabilities of scripting languages utilized herein. As a first example, the script language may be specified declaratively, i.e., as a series of elements that together describe the operations of the operation set. Declarative script languages may be advantageous for permitting a specifying of the script as a document (e.g., as an XML document), which may be more easily human-readable than a partially or wholly compiled set of machine-language instructions, and which may be more easily scanned by an automated parser for errors or vulnerabilities. However, the script language may (alternatively or additionally) utilize other programming paradigms, such as imperative procedural, object-oriented, and aspect-oriented programming.

As a second example of this second aspect, the script language may include many types of instructions, such as data set instructions corresponding to verbs of the protocol, and flow control instructions configured to alter an execution flow of the resource script in various ways. For example, various flow control instructions may be permitted that specify conditional executing of at least one operation (e.g., an "IF" instruction); relocating to a target operation of the operations set (e.g., a "GOTO" instruction); iterative executing of at least one operation (e.g., a "LOOP" instruction); concurrent executing of at least two operations (e.g., a "CONCUR- RENT" instruction); and asynchronous executing of at least one operation (e.g., an "INVOKE" instruction.) Resource scripts specified in such script languages may therefore comprise a set of one data set operations specifying such data set instructions and flow control operations specifying such flow control instructions to achieve a large variety of tasks.

As a third example of this second aspect, the script language may permit various forms of data binding, wherein a property of an operation may be unidirectionally or bidirectionally synchronized with a data source, such as (e.g.) a property of another operation in the operations set, a property of the client, or a property of the host. Alternatively or additionally, the property of the operation may be specified for data binding with an aspect of the protocol operation with which the resource script is associated. For example, a post-trigger resource script associated with a Read operation (such as a GET verb of an HTTP protocol) may be data-bound to the result of the operation in order to supplement the data set with additional information.

Figures 6, 7:
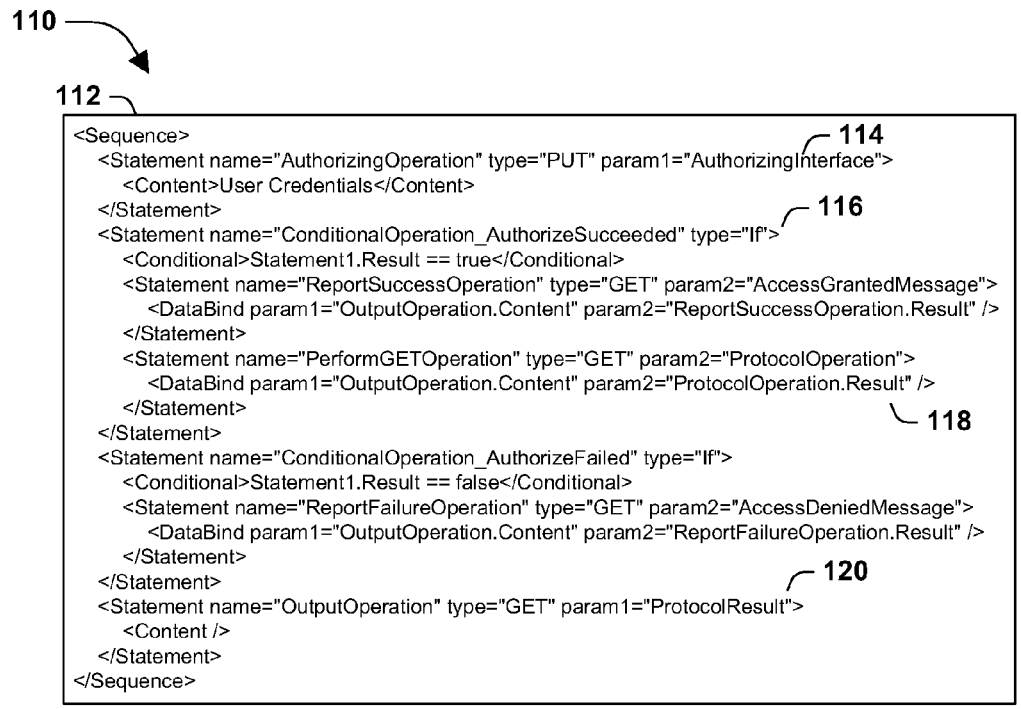
FIG. 6 is a pseudocode block illustrating an exemplary resource script that may be associated as a pre-trigger of a resource accessed through an HTTP GET operation to implement an authorization feature.
FIG. 7 is an illustration of a portion of a deployable computing environment including representations of resources having trigger associations with resource scripts also represented in the deployable computing environment.

FIG. 6 illustrates an exemplary use 110 of a resource script 112 that may be associated with a protected data set as a pre-trigger resource script in order to implement an access authorizing feature. The resource script 112 may be invoked, e.g., when a client attempts an HTTP GET operation on a webserver providing a RESTful interface to an account-restricted data set. First, the resource script 112 performs an operation ("AuthorizingOperation") that delivers an included set of user credentials to an authorizing process and receives a result of the authorizing process after it has examined the user credentials. The resource script 112 then tests the result of the authorizing process, and based on upon the result, the resource script 112 performs one of two sets of instructions. If the authorization succeeds ("ConditionalOperation_AuthorizeSucceeded"), the resource script 112 data-binds two objects to the result to an output operation: an "Access Granted" message, and the data set retrieved by performing the protocol GET operation ("PerformGETOperation"). However, if the authorization fails ("ReportFailureOperation"), the resource script 112 retrieves an access-denied message and data-binds it to the output operation. After performing these tests, the resource script performs an output operation ("OutputOperation") that is data-bound to one of the objects yielded by the conditional tests, and in turn data-binds this object to the result of the protocol request. The exemplary resource script 112 of FIG. 6 includes several of the examples of this second aspect. As a first example, the resource script 112 is declaratively specified as a nested hierarchy of elements comprising various statements that together describe how an authorization process may be achieved. As a second example, the resource script 112 includes both data set operations (e.g., the "AuthorizingOperation" operation 114 specifies a PUT operation that delivers the user credentials to a particular process of the host) and flow control operations (e.g., the "ConditionalOperation_AuthorizeSucceeded" operation 116 that tests the value of the "AuthorizingOperation" operation 114.) As a third example, the resource script 112 features several forms of data-binding, including a data-binding of a property of a first operation with a property of a second operation (e.g., data-binding the output of the "AuthorizeOperation" operation 114 to the input of the "ConditionalOperation_AuthorizeSucceeded" operation 116) and data-binding a property of the operation specified in the protocol request that triggered the resource script 112 (e.g., data-binding the result of the protocol operation 118 to the content property of the "OperationOutput" operation 120.) Those of ordinary skill in the art may devise many types of script languages and resource scripts specified therein while implementing the techniques discussed herein.

A third aspect that may vary among embodiments of these techniques relates to the configuration of a host in receiving the resource scripts and associating the resource scripts with particular data sets and verbs of the protocol. As a first example, a host may be configured to associate a particular resource script with many data sets (named individually and/or as part of a group of data sets sharing particular properties, such as all data sets in a healthcare-related system that represent patient information), and/or with many verbs of the protocol (e.g., only write-based operations of a protocol, such as HTTP POST, HTTP PUT, and HTTP DELETE but not HTTP READ.) As a second example, upon receiving a particular resource script, the host may be configured to execute the resource script before executing a verb of the protocol on the data set (i.e., as a pre-trigger resource script), and/or to execute the resource script after executing a verb of the protocol on the data set (i.e., as a post-trigger resource script.) As a third example, upon receiving a resource script, a host may be configured to inspecting the resource script for various aspects, such as script language errors that render the resource script unexecutable or resource script vulnerabilities that may compromise the integrity of the host and/or the data set, and the storing and associating of the resource script may be conditioned upon validating the resource script.

As a fourth example, where the data sets comprise resources in a deployable computing environment, the resource scripts may be integrated into the deployable computing environment. FIG. 7 illustrates an exemplary scenario 130 where a deployable computing environment 132 comprises a resources set 134 including representations of various resources 136. A host of the deployable computing environment 132 may be configured to receive resource scripts 140, to store them in a resource script set 138, and to form associations 144 relating particular resources 136 to particular resource scripts 140 according to various verbs of the protocol. Such associations 144 may also specify (e.g.) whether the resource script 140 is a pre-trigger resource script and/or a post-trigger resource script. Those of ordinary skill in the art may devise many configurations of a host for receiving, storing, and associating resource scripts while implementing the techniques discussed herein.

A fourth aspect that may vary among embodiments of these techniques relates to the executing of a resource script by a host upon receiving a protocol request specifying an associated verb and an associated resource. As a first example, the host may execute the resource script as a pre-trigger before applying the verb of the protocol request to the data set, and/or as a post-trigger after applying the verb of the protocol to the data set. In particular, the resource script may comprise a predicate condition of the verb, such that the verb is applied to the data set only if the predicate condition is fulfilled. For example, the resource script 112 of FIG. 6 may be associated with an HTTP GET verb to provide a preconditional authorizing feature, such that the HTTP GET verb is only applied to the data set if the client is confirmed (e.g., by an account store) as having read permission to the data set. In this scenario, the host may be configured, upon receiving a protocol request specifying the verb and the resource that are associated with the predicate condition resource script, to first execute the resource script before executing the protocol request, and to condition the executing of the protocol request on a fulfilling of the predicate condition of the resource script.

As a second example of this fourth aspect, a resource script may include an operation that specifies a data binding, e.g., with a property of another operation, or with an aspect of the host or the client, or with an aspect of the protocol request. For example, in the resource script 112 of FIG. 6, the "PerformGETOperation" operation includes a data binding of the result of the protocol operation 118 to the content property of the "OperationOutput" operation 120. Accordingly, a host may be configured, upon executing such a resource script, to data-bind the operation as specified (e.g., to the specified property of the other operation, or to the specified aspect of the host, client, or protocol request.)

As a third example of this fourth aspect, the executing of the resource script may generate a result, which may be supplemental of or unrelated to any result that may be generated from the applying of the protocol request to the data set. For example, the resource script 112 of FIG. 6 may result in an "Access Denied" message if the authorization fails. Upon executing a resource script associated as a trigger with a protocol request, the host may receive one or more results from the resource script. The host may then be configured to return the result of the resource script along with a protocol response generated in response to the protocol request. For example, if the authorization in the resource script 112 of FIG. 6 succeeds, the resource script 112 results in an "Access Granted" message being included with the result of the protocol request. Those of ordinary skill in the art may devise many configurations of the host to achieve the executing of the resource scripts in various contexts in relation to protocol requests in accordance with the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
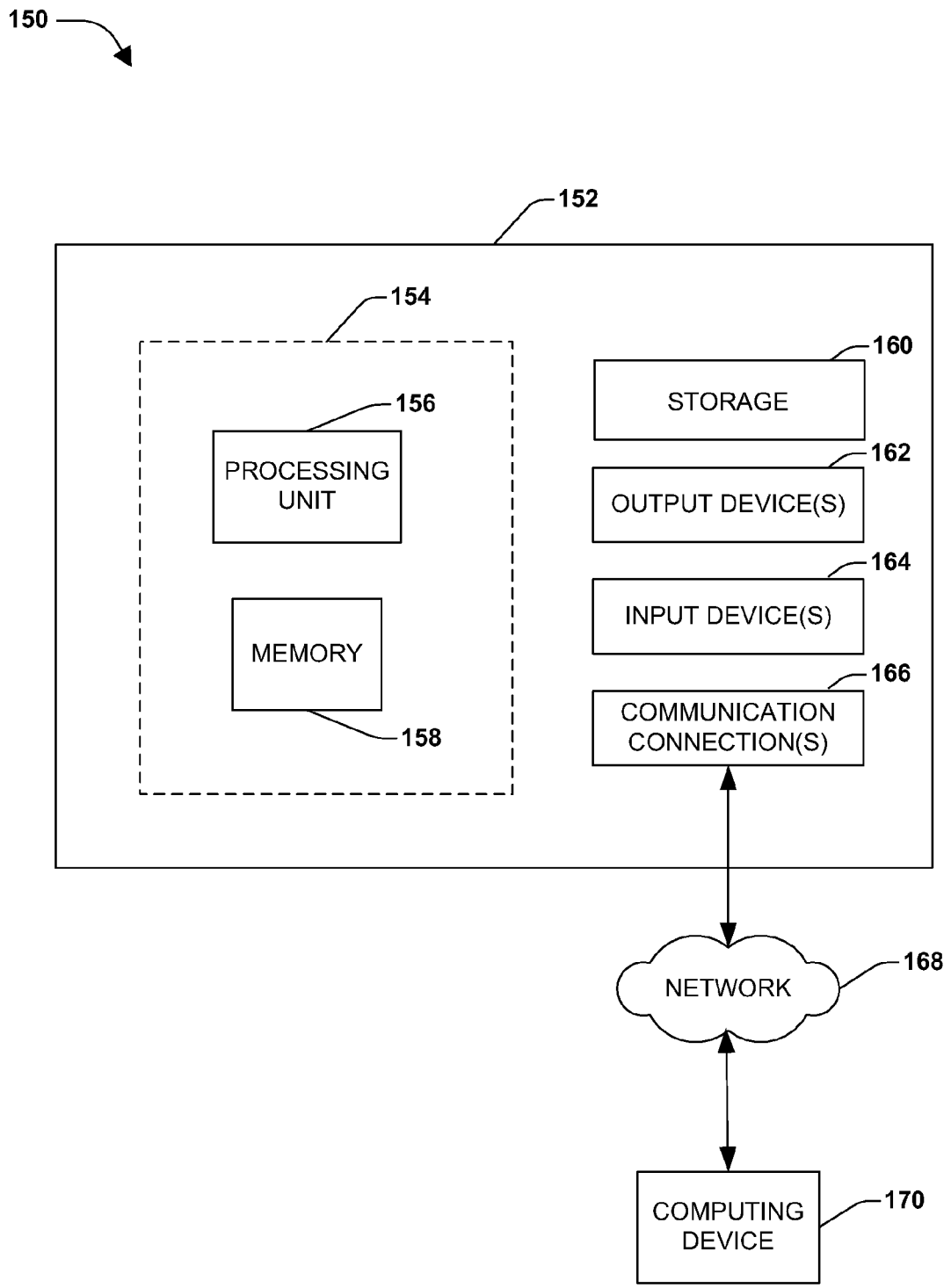
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 150 comprising a computing device 152 configured to implement one or more embodiments provided herein. In one configuration, computing device 152 includes at least one processing unit 156 and memory 158. Depending on the exact configuration and type of computing device, memory 158 may be volatile (such as RAM, for example), non-volatile (such as ROM, flash memory, etc., for example) or some combination of the two. This configuration is illustrated in FIG. 8 by dashed line 154.

In other embodiments, device 152 may include additional features and/or functionality. For example, device 152 may also include additional storage (e.g., removable and/or non-removable) including, but not limited to, magnetic storage, optical storage, and the like. Such additional storage is illustrated in FIG. 8 by storage 160. In one embodiment, computer readable instructions to implement one or more embodiments provided herein may be in storage 160. Storage 160 may also store other computer readable instructions to implement an operating system, an application program, and the like. Computer readable instructions may be loaded in memory 158 for execution by processing unit 156, for example.

The term "computer readable media" as used herein includes computer storage media. Computer storage media includes volatile and nonvolatile, removable and non-removable media implemented in any method or technology for storage of information such as computer readable instructions or other data. Memory 158 and storage 160 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 152. Any such computer storage media may be part of device 152.

Device 152 may also include communication connection(s) 166 that allows device 152 to communicate with other devices. Communication connection(s) 166 may include, but is not limited to, a modem, a Network Interface Card (NIC), an integrated network interface, a radio frequency transmitter/receiver, an infrared port, a USB connection, or other interfaces for connecting computing device 152 to other computing devices. Communication connection(s) 166 may include a wired connection or a wireless connection. Communication connection(s) 166 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 152 may include input device(s) 164 such as keyboard, mouse, pen, voice input device, touch input device, infrared cameras, video input devices, and/or any other input device. Output device(s) 162 such as one or more displays, speakers, printers, and/or any other output device may also be included in device 152. Input device(s) 164 and output device(s) 162 may be connected to device 152 via a wired connection, wireless connection, or any combination thereof. In one embodiment, an input device or an output device from another computing device may be used as input device(s) 164 or output device(s) 162 for computing device 152.

Components of computing device 152 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 152 may be interconnected by a network. For example, memory 158 may be comprised of multiple physical memory units located in different physical locations interconnected by a network.

Those skilled in the art will realize that storage devices utilized to store computer readable instructions may be distributed across a network. For example, a computing device 170 accessible via network 168 may store computer readable instructions to implement one or more embodiments provided herein. Computing device 152 may access computing device 170 and download a part or all of the computer readable instructions for execution. Alternatively, computing device 152 may download pieces of the computer readable instructions, as needed, or some instructions may be executed at computing device 152 and some at computing device 170.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

It may be appreciated that a resource script may comprise a resource script.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of executing operations sets on data sets accessible through a host having a processor according to a protocol, comprising:
   executing on the processor instructions configured to:
      for a data set and a verb of the protocol associated with an action, associate at least one operations set other than the action with the verb of the protocol and the data set; and
      upon receiving a protocol request specifying a verb of the protocol and a data set:
         execute the action associated with the verb of the protocol to fulfill the protocol request; and
         additionally execute at least one operations set associated with the verb and the data set.

2. The method of claim 1, executing the operations set comprising at least one of:
   executing the operations set before executing a verb of the protocol on the data set, and
   executing the operations set after executing a verb of the protocol on the data set.

3. The method of claim 1:
   the data set comprising a resource represented in a domain, and
   the operations set specifying a domain-specific operation on the data set within the domain.

4. The method of claim 1, the data set comprising at least one resource represented in a deployable computing environment hosted by the host.

5. The method of claim 1:
   the protocol comprising HTTP;
   the verbs of the protocol comprising HTTP POST, HTTP GET, HTTP PUT, and HTTP DELETE; and
   the host comprising an HTTP endpoint.

6. The method of claim 1, at least one operations set expressed as a resource script specified in a script language, the resource script comprising:
   at least one data set instruction corresponding to at least one verb of the protocol, and
   at least one flow control instruction configured to alter an execution flow of the resource script.

7. The method of claim 1, the operations set comprising at least one operation specifying at least one data binding with at least one aspect of the protocol request.

8. The method of claim 1:
the operations set generating a result, and
the method comprising: receiving the result included in a protocol response returned by the host in response to the protocol request.

9. The method of claim 1:
at least one operations set expressed as a resource script in a script language; and
the receiving comprising:
  inspecting the resource script for at least one of:
    a script language error, and
    a resource script vulnerability; and
  upon validating the resource script:
    storing the resource script, and
    associating the resource script with the verb of the protocol and the data set.

10. A method of executing operations sets on data sets accessible according to a protocol on a host having a processor and a memory, comprising:
executing on the processor instructions configured to:
  upon receiving a request to associate, with a data set and a verb of the protocol that is associated with an action, an operations set other than the action of the verb:
    store the operations set in the memory, and
    associate the operations set with the verb of the protocol and the data set; and
  upon receiving a protocol request specifying a verb of the protocol and a data set:
    execute the action associated with the verb of the protocol to fulfill the protocol request; and
    additionally execute at least one operations set associated with the verb and the data set.

11. The method of claim 10, the executing comprising at least one of:
executing the operations set before executing the verb of the protocol on the data set, and
executing the operations set after executing the verb of the protocol on the data set.

12. The method of claim 10:
the operations set comprising a predicate condition of the verb, and
the executing comprising:
  executing the operations set before executing the protocol request, and
  conditioning executing the protocol request on a fulfilling of the predicate condition of the operations set.

13. The method of claim 10:
the data set comprising a resource represented in a domain, and
the operations set specifying a domain-specific operation on the data set within the domain.

14. The method of claim 10, the data set comprising at least one resource represented in a deployable computing environment.

15. The method of claim 14:
the storing comprising: storing the operations set in the deployable computing environment; and
the associating comprising: associating the operations set with the data set in the deployable computing environment.

16. The method of claim 10:
the protocol comprising HTTP;
the verbs of the protocol comprising HTTP POST, HTTP GET, HTTP PUT, and HTTP DELETE; and
the host comprising an HTTP endpoint.

17. The method of claim 10:
at least one operations set expressed as a resource script in a script language; and
the receiving comprising:
  inspecting the resource script for at least one of:
    a script language error, and
    a resource script vulnerability; and
  upon validating the resource script:
    storing the resource script, and
    associating the resource script with the verb of the protocol and the data set.

18. The method of claim 10:
the operations set comprising at least one operation specifying at least one data binding with at least one aspect of the protocol request; and
executing the operations set comprising: data binding the at least one operation with the at least one aspect of the protocol request.

19. The method of claim 10:
the operations set generating a result, and
the method comprising: returning the result of the operations set with a protocol response generated in response to the protocol request.

20. A method of executing an operations set specifying a domain-specific operation on a data set comprising a resource represented in a domain in a deployable computing environment hosted by a host having a processor and accessible according to a protocol, comprising:
executing on the processor instructions configured to:
  express the operations set as a resource script in a declarative script language comprising:
    at least one data set instruction corresponding to at least one verb of the protocol, and
    at least one flow control instruction configured to alter an execution flow of the resource script,
  the resource script comprising at least one data set operation and at least one flow control operation;
  associate the data set with at least one verb of the protocol and at least one resource script;
  upon receiving a protocol request specifying the verb of the protocol and the data set, at least one of:
    execute the at least one resource script before executing a verb of the protocol on the data set, and
    execute the at least one resource script after executing a verb of the protocol on the data set; and
  receive a result generated by the resource script and included in a protocol response returned by the host in response to the protocol request.

* * * * *